Jan. 27, 1959
E. N. CONNOY
2,871,417
MAGNETIZING AND DEMAGNETIZING APPARATUS
Filed Oct. 14, 1957
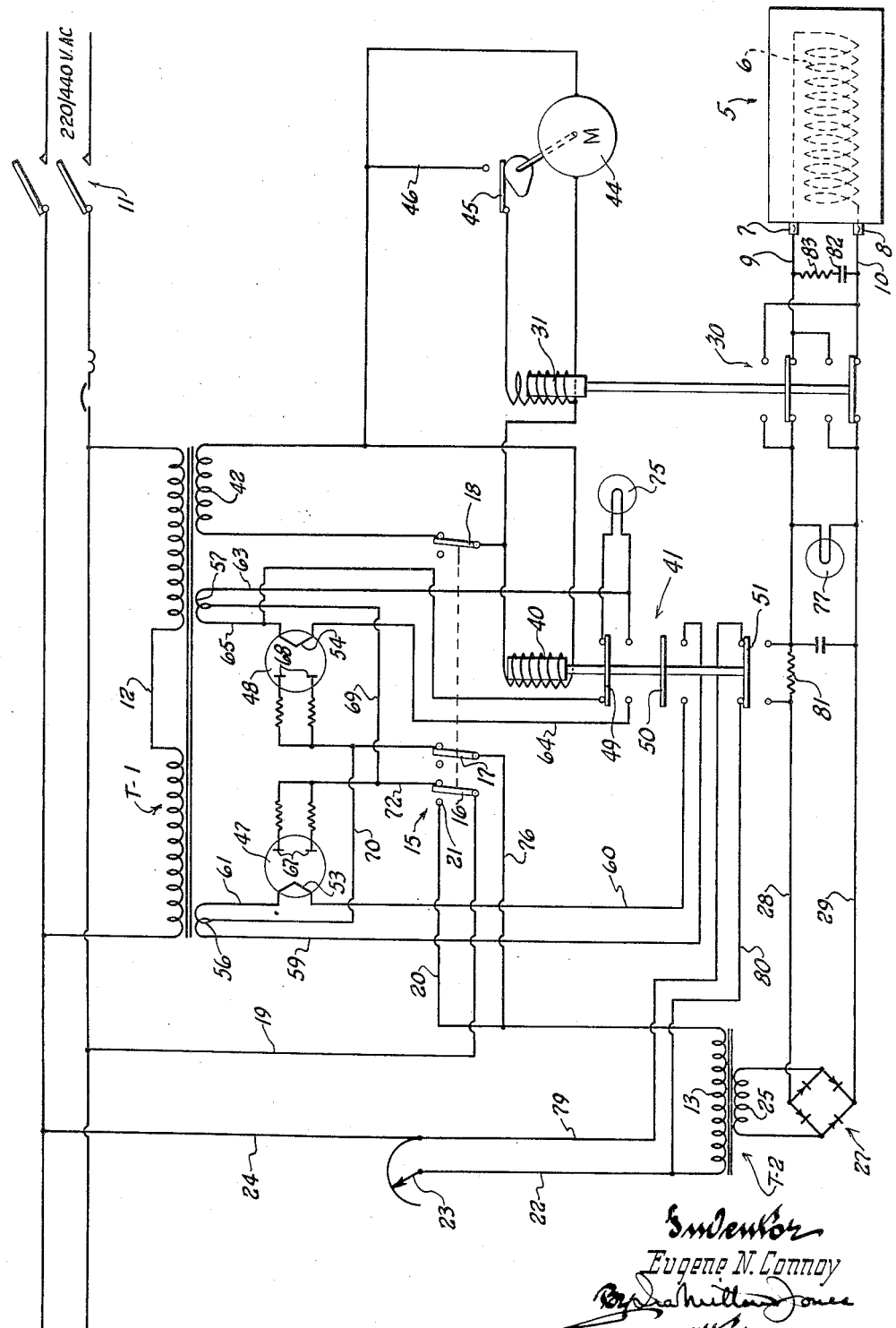
Inventor
Eugene N. Connoy
Attorney

United States Patent Office 2,871,417
Patented Jan. 27, 1959

2,871,417

MAGNETIZING AND DEMAGNETIZING APPARATUS

Eugene N. Connoy, Minneapolis, Minn., assignor to Continental Machines, Inc., Savage, Minn., a corporation of Minnesota Application October 14, 1957, Serial No. 689,901

1 Claim. (Cl. 317—123)

This invention relates to magnetizing and demagnetizing apparatus and refers more particularly to an apparatus especially adapted for use in magnetizing and demagnetizing electromagnetic chucks of the kind used for holding ferrous metal parts during milling, grinding or other similar machine operations.

United States Letters Patent No. 2,786,970, issued March 26, 1957 to Eugene N. Connoy, discloses a magnetizing and demagnetizing apparatus of the general type here under consideration, wherein a coil is energized with direct current for magnetization and with a gradually diminishing alternating current for demagnetization. In the apparatus of that patent direct current for magnetizing is supplied to the coil from the output terminals of a full wave dry-plate rectifier having its input terminals connected with a source of alternating current. For demagnetizing, a steadily diminishing direct current is supplied from the output terminals of a full wave rectifier circuit which employs a pair of hot cathode, high vacuum rectifier tubes, and such direct current has its polarity periodically reversed by means of an automatic polarity reversing switch connected across the output of these high vacuum rectifier tubes. The cathodes of the high vacuum rectifier tubes are energized during the magnetizing part of the cycle, and the cathode energizing circuits are opened during demagnetization so that the tubes will pass a steadily diminishing current as they cool.

The circuit of said patent was highly satisfactory in apparatus having a high voltage magnetizing coil, using a power of 300 to 400 watts, but with a substantially smaller device, using lower power and voltage, high vacuum rectifier tubes cannot be used in the manner there disclosed. When operated at low voltages, as in conjunction with a 24-volt electromagnetic chuck, the current output of hot cathode, high vacuum rectifier tubes used in that way would be insufficient to effect complete demagnetization. Moreover, with the circuit shown in said patent the output of the high vacuum rectifier tubes was a direct current, so that it obviously could not be applied to the primary winding of a transformer to be thus stepped down.

However, low voltage electromagnetic chuck devices, unlike those using high voltages, can be built with very inexpensive, reliable and compact components, and consequently low voltage electromagnetic chucks are very popular.

With these facts in mind, it is an object of the present invention to provide demagnetizing apparatus for use with a low voltage electromagnetic chuck wherein a pair of high vacuum rectifier tubes is utilized to provide a gradually decreasing alternating current which may be applied to the primary winding of a step down transformer having its secondary connected with a full wave dry-plate rectifier, the rectifier output being in turn connected with the coil of the chuck through a polarity reversing switch mechanism.

Stated another way, it is an object of the present invention to provide means for demagnetizing a low voltage (e. g., 24 volt) electromagnetic chuck, wherein a pair of high vacuum rectifier tubes is employed to provide a steadily diminishing current, and wherein the high vacuum rectifier tubes are operated at a high enough input voltage so that they will produce ample power for adequate demagnetiziation of the electromagnetic chuck.

Another object of this invention resides in the provision of apparatus for deriving a gradually diminshing alternating current from a source of alternating current at a substantially constant value, which apparatus utilizes the characteristic of hot cathode high vacuum rectifier tubes of passing a steadily diminishing current as their cathodes cool.

Still another object of this invention resides in the provision of an apparatus for magnetizing and demagnetizing an electromagnetic chuck or the like, wherein direct current for magnetizing is derived, through a dry-plate rectifier bridge circuit, from a source of alternating current, and wherein a pair of high vacuum rectifier tubes is employed to apply a steadily diminishing alternating current to the input terminals of the rectifier bridge circuit, so that the diminishing direct current output of the rectifier bridge may be utilized for demagnetization in accordance with the teachings of the aforesaid Patent No. 2,786,970.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which the single figure is a circuit diagram of a magnetizing and demagnetizing unit embodying the principles of this invention.

Referring now more particularly to the accompanying drawing, the numeral 5 designates an electromagnetic chuck of any conventional low voltage design having a coil provided with terminals 7 and 8. These terminals are adapted to have the output leads 9 and 10 of the magnetizing and demagnetizing unit connected thereto, as by means of a conventional plug and socket.

The unit is equipped with a main power switch 11, whereby the primary 12 of a transformer T–1 is connectible with the supply line and whereby the primary 13 of a second transformer T–2 may be connected with the supply line through a manually controllable switch 15. The manually controllable switch 15 has a plurality of contactors, 16, 17 and 18, constrained to move in unison to either a "Magnetize" or a "Demagnetize" position, the switch being shown in its "Demagnetize" position.

To connect the transformer T–2 with the A. C. supply line when the manually controllable switch 15 is in its "Magnetize" position, a conductor 19 connects one terminal of the A. C. line with a contactor 16 of the switch 15, and a conductor 20 connects a cooperating terminal 21 of the switch 15 with one side of the primary 13. The other side of the primary 13 is connected through a conductor 22, a rheostat 23 and another conductor 24 with the opposite terminal of the A. C. line. The rheostat is used for regulating the magnetizing current applied to the coil 6, and it thus controls the holding force of the chuck.

Transformer T–2 is a step-down transformer which forms a part of a low voltage rectifier means that includes its secondary winding 25 and a dry-plate type, full wave rectifier bridge network 27, the A. C. input terminals of which are directly connected with secondary winding 25. The direct current output terminals of the rectifier bridge network are connected with the coil 6 of the chuck by means of conductors 28 and 29 and other instrumentalities, including a polarity reversing switch mechanism 30 actuated by a solenoid 31.

When the manually controllable switch 15 is set to its "Demagnetize" position, as shown, contactor 18 thereof closes a circuit which connects the solenoid 40 of a relay switch 41 across a secondary winding 42 of transformer T-1 and thereby causes the relay switch to be actuated to its demagnetizing position, as shown. Shunted across the relay switch solenoid, and thus controlled by contactor 18 of switch 15, is a motor 44 by which a switch 45 is periodically opened and closed; and switch 45, in turn, is connected in series with the solenoid 31 which actuates the polarity reversing switch mechanism. The solenoid 31 and switch 45 are also shunted across the relay switch solenoid 40 by a conductor 46.

For demagnetization it is of course not only necessary to effect rapid reversals of the polarity of the current supplied to coil 6, but also to steadily diminish the value of such current to zero. To this end, a diminishing alternating current is applied to the primary of transformer T-2 during demagnetization, by means of a circuit now about to be described, and which includes a pair of hot cathode, high vacuum rectifier tubes 47 and 48, which may be 5U4GB tubes. Although these tubes are nominally rectifiers, they are connected "back-to-back", as described hereinafter, so that they cooperate in passing a diminishing alternating current, each tube passing one phase of such current, and the two tubes together acting as an automatic rheostat.

The relay switch 41 has a plurality of contactors 49, 50 and 51, constrained to move in unison to a demagnetizing position to which they are actuated in consequence of energization of solenoid 40 and to a magnetizing position to which they are biased.

When the relay switch 41 is in its magnetizing position, with its solenoid 40 unenergized, two of its contactors 49 and 50 close circuits which connect the cathodes 53 and 54 of high vacuum rectifier tubes 47 and 48 with secondary windings 56 and 57 respectively of transformer T-1, so that the cathodes are energized and heated by the currents induced in said secondaries. The connections to cathode 53 may be traced through a conductor 59 connecting one side of the secondary winding 56 with the contactor 50, a conductor 60 connected from the relay switch to one terminal of the cathode, and a conductor 61 connecting the other terminal of the cathode with the other side of secondary winding 56. Similarly, the energizing circuit for the filament 54 of tube 48 may be traced from one side of secondary winding 57, through conductor 63, to switch contactor 49, and thence by way of conductor 64 to one terminal of the filament, the other terminal of the filament being connected, by means of conductor 65, with the other side of secondary 57.

The two plates 67 of the tube 47 are connected together, as are the plates 68 of the tube 48, so that the plates of each tube function as a single anode. The "back-to-back" connection of the tubes resides in the connection of the anode of each with the cathode of the other. Thus the anode 67 of tube 47 is connected with the cathode 54 of tube 48 by means of a conductor 69 connected with a center tap of secondary winding 57, half of the secondary forming a connection between conductor 69 and conductor 65. Similarly, anode 68 of tube 48 is connected by means of a conductor 70 with a center tap on secondary winding 56, which thus connects with filament 53 by way of conductor 61.

With the manually controllable switch 15 in the "Demagnetize" position shown, the cathodes of the high vacuum rectifier tubes are of course cut out of their energizing circuits by the relay switch 41, and the tubes begin to cool. At the same time, the switch 15 provides for connection of the high vacuum rectifier tubes between one side of the A. C. supply line and one terminal of the secondary 13 of transformer T-2, so that the cooling tubes will in effect valve a steadily diminishing alternating current from the A. C. line to the rectifier means. For this purpose a conductor 72 connects the anode 67 of the tube 47 with the contactor 16 of switch 15, so that when that switch is in its "Demagnetize" position said anode is connected with one side of the A. C. supply line through conductor 19, and at the same time contactor 17 of the switch 15 connects anode 68 of the tube 48 with conductor 20 through jumper lead 76, and thus with one side of secondary winding 13. It will be observed that contactor 16 provides alternate connections for the one side of secondary 13, either directly to the line when the switch is in its "Magnetize" position, or to the high vacuum rectifier tube circuit when the switch is in its "Demagnetize" position.

It will be seen that when the high vacuum rectifier tubes are connected into the rectifier means circuit, during demagnetization, each will pass current of one phase; and because of their back-to-back connection the two tubes will cooperate in passing both phases of alternating current, their function during cooling of their cathodes being essentially that of an automatic rheostat.

To indicate that demagnetization is occurring, a pilot light 75 may be connected across secondary winding 57 of transformer T-1 by means of contactor 49 of the relay switch 41, which energizes the light when the switch is in its demagnetizing position. Another pilot light 77 may be connected across the conductors 28 and 29 which carry the direct current output of the rectifier means. Pilot light 77 will be lit whenever current is flowing to coil 6, and hence will be on during both magnetization and demagnetization, but will be slowly extinguished during demagnetization, as the current diminishes, to provide a visual indication of the completion of demagnetization.

The contactor 51 on relay switch 41 shorts out rheostat 23 when the relay switch is in its demagnetizing position, the connection across the rheostat being provided by conductors 79 and 80 which connect the rheostat with the switch. In the magnetizing position of switch 41 the contactor 51 shorts out a voltage limiting resistor 81 in the output of the rectifier bridge network 27.

Although the output of rectifier network 27 is a direct current, it will be understood that during demagnetization the polarity of the current will be periodically reversed by the polarity reversing switch mechanism 30, so that the current will actually be applied to the coil terminals 7 and 8 as an alternating current. Shunted across the conductors 9 and 10 which connect the polarity reversing switch with the respective terminals 7 and 8 of the coil 6 is a condenser 82 connected in series with a resistor 83. The function of this condenser is more fully disclosed in the aforesaid Patent No. 2,786,970, but briefly, each time the polarity reversing switch opens, a charge is built up in the condenser by the back E. M. F. in coil 6 caused by the collapse of its flux, and this charge is of a polarity to augment the next A. C. pulse delivered to the coil through the polarity reversing switch. The condenser also helps to reduce the arcing at the contacts of the polarity reversing switch.

From the foregoing description taken together with the accompanying drawing, it will be apparent that this invention provides means for deriving a steadily diminishing alternating current from a source of alternating current at a substantially constant value, and that it enables a pair of high vacuum rectifier tubes to be used efficiently in the demagnetization of a low voltage electromagnetic chuck.

What is claimed as my invention is:

In a magnetizing and demagnetizing apparatus of the type comprising rectifier means having alternating current input terminals and including a full wave rectifier having direct current output terminals, a magnetizing coil connected with the direct current output terminals of the rectifier means, and switch controlled means for effecting periodic reversals of the polarity of the current output of the rectifier means during demagnetization: a pair of hot cathode high vacuum rectifier tubes which remain conductive as long as the temperatures of their cathodes are above a predetermined minimum and gradually conduct less current as their cathodes cool; means connecting the cathode of each tube with the anode of the other; energizing circuits for the cathodes of said tubes; switch means in said energizing circuits for controlling energization and deenergization of the cathodes; conductor means connecting one terminal of an alternating current source with an input terminal of the rectifier means; means providing a connection between the anode of one tube and the other terminal of the alternating current source; means including switch means for alternatively connecting the other input terminal of the rectifier means with the other terminal of the alternating current source to provide for magnetization, or with the anode of the other tube to provide for demagnetization, said last named switch means being adapted to be operated concomitantly with the switch means controlling energization and deenergization of the cathodes and with the switch means controlling said means for effecting periodic reversals of polarity of the output current of the rectifier means, so that as the cathodes of the tubes cool subsequently to deenergization thereof, the tubes will pass a constantly diminishing current from said alternating current source to the input terminals of the rectifier means, and the polarity reversing means will effect reversals of polarity of such rectified diminishing current to effect demagnetization.

References Cited in the file of this patent

UNITED STATES PATENTS

| 2,144,995 | Pulvermacher | Jan. 24, 1939 |
| 2,786,970 | Connoy | Mar. 26, 1957 |